United States Patent [19]
Clapp

[11] Patent Number: 5,987,131
[45] Date of Patent: Nov. 16, 1999

[54] CRYPTOGRAPHIC KEY EXCHANGE USING PRE-COMPUTATION

[75] Inventor: Craig S. K. Clapp, Boxford, Mass.

[73] Assignee: PictureTel Corporation, Andover, Mass.

[21] Appl. No.: 08/914,384

[22] Filed: Aug. 18, 1997

[51] Int. Cl.[6] .............................. H04L 9/08; H04L 9/30
[52] U.S. Cl. ............................ 380/21; 380/9; 380/30; 380/49; 380/50
[58] Field of Search .................................. 380/9, 21, 44, 380/45, 46, 47, 49, 50, 59, 30

[56] References Cited

U.S. PATENT DOCUMENTS

| | | | |
|---|---|---|---|
| 5,274,707 | 12/1993 | Schlafly | 380/30 |
| 5,369,708 | 11/1994 | Kawamura et al. | 380/30 |
| 5,499,299 | 3/1996 | Takenaka et al. | 380/30 X |
| 5,588,061 | 12/1996 | Ganesan et al. | 380/30 |
| 5,600,725 | 2/1997 | Rueppel et al. | 380/30 |

OTHER PUBLICATIONS

Odlyzko, "Discrete Logarithms and Smooth Polynomials," *Contemporary Mathematics*, vol. 168:269–278, 1994.

Montgomery, "Modular Multiplication Without Trial Division," *Mathematics of Computation*, vol. 44;519–521, Apr. 1985.

Digital Signature Standard, *Federal Information Processing Standards Publication 186*, May 19, 1994. U.S. Department of Commerce.

Bos, et al., "Addition Chain Heuristics," *Lecture Notes in Computer Science, Advances in Cryptology–Crypto '89*, 401–407.

Brickell, et al., "Fast Exponentiation with Precomputation (Extended Abstract)", *Advances in Cryptology—Eurocrypt '92, Workshop on the Theory and Application of Cryptographic Techniques*, 201–207, May 1992.

Sauerbrey, et al., Resource Requirements for the Application of Addition Chains in Modulo Exponentiation, *Advances in Cryptology—Eurocrypt '92, Workshop on the Theory and . . .*, 175–182, May 1992.

Kocher, "Timing Attacks on Implementations of Diffie–Hellman, RSA, DSS, and Other Systems," *Advances in Cryptology—Crypto '96, 16th Annual International Cryptology Conference*, 105–113, Aug. 1996.

(List continued on next page.)

*Primary Examiner*—Bernarr E. Gregory
*Attorney, Agent, or Firm*—Fish & Richardson P.C.

[57] ABSTRACT

A public-key method of cryptographic key exchange using modular exponentiation in which memory, for storing pre-computed results, can be flexibly traded off against the computational complexity of key-exchange. In a typical embodiment, the invention performs key exchange by the method of Diffie-Hellman but with exponents having a constrained form such that by use of a small table of pre-computed powers of a user's public key, any possible shared secret key within the allowed set can be computed with many fewer modular multiplications than the number of bits of effective key-length thereby obtained. The table of pre-computed powers is transmitted as part of the key exchange protocol. The party in receipt of the table uses the pre-computed powers of the sender's public key to replace calculations that would otherwise need to be done at key-exchange time. The method allows a flexible trade-off between computation and table size. The method of accelerating modular exponentiation can also be applied to other cryptographic operations in which the number to be raised to a power is fixed or known in advance and where the exponent is allowed to be of the specified form.

22 Claims, 2 Drawing Sheets

OTHER PUBLICATIONS

Rivest, et al., "A Method for Obtaining Digital Signatures and Public–Key Cryptosystems," *Communication of the ACM,* vol. 21: 120–126, Feb. 1978.

Coppersmith, "Fast Evaluation of Logarithms in Fields of Characteristic Two," *IEEE Transactions Information Theory,* vol. IT–30:587–594, Jul. 1984.

Diffie, et al., "New Directions in Cryptography," *IEEE Transactions on Informaton Theory,* vol. IT–22;644–654, Nov. 1976.

van Oorschot, et al., "Parallel Collision Search With Application to Hash Functions and Discrete Logarithms" *Bell–Northern Research,* 210–218, Aug. 1994.

Seminumerical Algorithms, vol. 2, The Art of Computer Programming, Second Edition. (index only).

CRYPTOGRAPHIC KEY EXCHANGE USING PRE-COMPUTATION

BACKGROUND OF THE INVENTION

The invention relates to public key cryptography, and more particularly to the exchange of keys over insecure communications channels.

The problem of distributing keys for cryptographic purposes is well known. Diffie and Hellman introduced the concept of public-key cryptography, allowing for the first time the possibility of secure communication over an insecure channel without the need for some other secure channel through which to first distribute cryptographic keys. Public key cryptography according to Diffie and Hellman provides a practical and secure scheme for establishing shared secret keys between communicating parties through the exchange of publicly observable information. Their method involves exponentiation in a finite field and its security relies on the computational intractability of inverting such exponentiations, that is, of finding discrete logarithms in a finite field.

In its basic form the Diffie-Hellman key-agreement protocol proceeds as follows (with all exponentiations being modular exponentiations with modulus p):

1) An appropriate prime p and a generator g of $Z_p^*$, the multiplicative group of residue classes modulo p, with $2 \leq g \leq p-2$, are selected and published.
2) Each time participants A and B require a shared key:
   A chooses a random secret x with $1 \leq x \leq p-2$ and sends $g^x \bmod p$ to B.
   B chooses a random secret y with $1 \leq y \leq p-2$ and sends $g^y \bmod p$ to A.
   B receives $g^x$ and computes the common shared key as $$(g^x)^y \bmod p.$$

A receives $g^y$ and computes the common shared key as $$(g^y)^x \bmod p.$$

A and B's keys are identical because $$(g^x)^y \bmod p \equiv (g^y)^x \bmod p \equiv g^{xy} \bmod p.$$

An eavesdropper who sees $g^x \bmod p$ and $g^y \bmod p$ in transmission cannot feasibly calculate $g^{xy} \bmod p$ because of the believed computational intractability of discovering x from $g^x \bmod p$ or y from $g^y \bmod p$.

It is well-known to those practiced in the art that these techniques are applicable to Diffie-Hellman key exchange using other finite groups, in particular the multiplicative group of finite fields of characteristic 2, and elliptic curve groups over finite fields.

For each participant, the above protocol involves the computation of two modular exponentiations. To perform this calculation, public-key agreement techniques typically impose a computational burden comparable to performing several hundred modular multiplications over a field of several hundred bits in length.

The above protocol provides no authentication of keys, and so is vulnerable to a man-in-the-middle attack in which participants A and B end up each exchanging keys with the attacker instead of with each other. One variation of the protocol that provides mutual key authentication and so overcomes this problem is to fix $g^x \bmod p$ and $g^y \bmod p$ as the long-term public keys of A and B respectively, and to distribute these keys using certificates signed by a mutually trusted third party or parties. This fixes the long-term secret shared key for this pair of users as $g^{xy} \bmod p$. Prudent security practices well known to those skilled in the art dictate that such a key, being time-invariant in nature, should not be directly used as the session key, but rather that session keys should be freshly derived from the long-term shared secret key in such a way as not to compromise it should the session keys themselves become revealed to an attacker. Although verification of the signatures on certificates adds to the computational load, there are public-key signature schemes for which the verification operation needs only one or two modular multiplications, for example, RSA signatures with a public exponent of 3, or modified-Rabin signatures.

For widespread application of public-key techniques in consumer electronics devices there is a need to reduce the computational burden to that which an inexpensive device such as a single chip microcontroller can perform in a fraction of a second. One such example application is key-agreement for the encrypted transmittal of copyright-protected digital video streams between a consumer electronics playback device, such as a digital video disk (DVD) player, and a digital television, wherein the data is desired to be encrypted in transit between the two devices in order to protect the data from unauthorized copying.

One way to decrease the computational burden on the parties is to reduce the number of operations required to perform modular exponentiation. One way to do this is to pre-compute and store as much of the overall exponentiation computation as possible. Another way that has been suggested to improve computational economy is the use of exponents of restricted form. For example, the U.S. government's Digital Signature Algorithm uses short exponents whose length is just 160 bits despite the fact that modular exponentiation is performed using a modulus whose size may vary from 512 bits to 1024 bits. The standard method of direct attack against a short exponent is a meet-in-the-middle attack. Such attacks have complexity that is approximately exponential in half the length of the exponent, that is, on the order of the square-root of the number of possible values that the exponent can take. A common choice of exponent length is 160 bits for proof against a meet-in-the-middle attack needing about $2^{80}$ operations, which is believed to be comfortably beyond reach with current technology. A prime field offering comparable resistance to the calculation of discrete logarithms needs to be somewhere between 512 and 1024 bits in length.

SUMMARY OF THE INVENTION

The invention relates generally to cryptography and more specifically to exchanging cryptographic keys between two cryptographic units, and to a method for fast exponentiation utilized in cryptographic schemes when the base is fixed or known in advance and the exponent may be freely chosen for computational convenience.

In a typical embodiment, the invention performs key exchange by the method of Diffie-Hellman, but with exponents having a constrained form such that by use of a small table of pre-computed values, any possible shared secret key within the allowed set can be computed with many fewer modular multiplications than the number of bits of effective key length thereby obtained. The table of pre-computed powers is transmitted as part of the key exchange protocol. The party in receipt of the table of pre-computed powers uses the table to replace calculations that would otherwise need to be done at key exchange time.

One advantage of the invention is that it provides a public-key method of cryptographic key exchange using modular exponentiation in which memory, for storing pre-computed results, can be flexibly traded off against the computational complexity of the key exchange. Specifically, the invention provides for efficientl and secure key exchange between two parties, both of whom have limited memory and computational resources, such as between two devices each of which is equipped with little more than a single-chip microcontroller. An example of the tradeoff provided by the invention is that mutual key-agreement where users' private keys can take any one of more than $2^{160}$ possible values can be achieved according to the invention by using just 40 modular multiplications and a table of 40 entries. Other examples, for this same size key, include using 30 modular multiplications and a table of 120 entries, 50 modular multiplications and a table of 20 entries, 60 modular multiplications and a table of 12 entries, or 80 modular multiplications and a table of 6 entries.

One objective of the invention is to reduce susceptibility to timing attacks while maintaining computational efficiency. One way in which this objective is achieved is by restricting the method to use only exponents for which advantageously short, uniform length, addition chains may trivially be found.

Other features and advantages of the invention will become apparent from the following description of preferred embodiments, including the drawings, and from the claims.

DETAILED DESCRIPTION OF THE PREFERRED EMBODIMENTS

Figure 1:
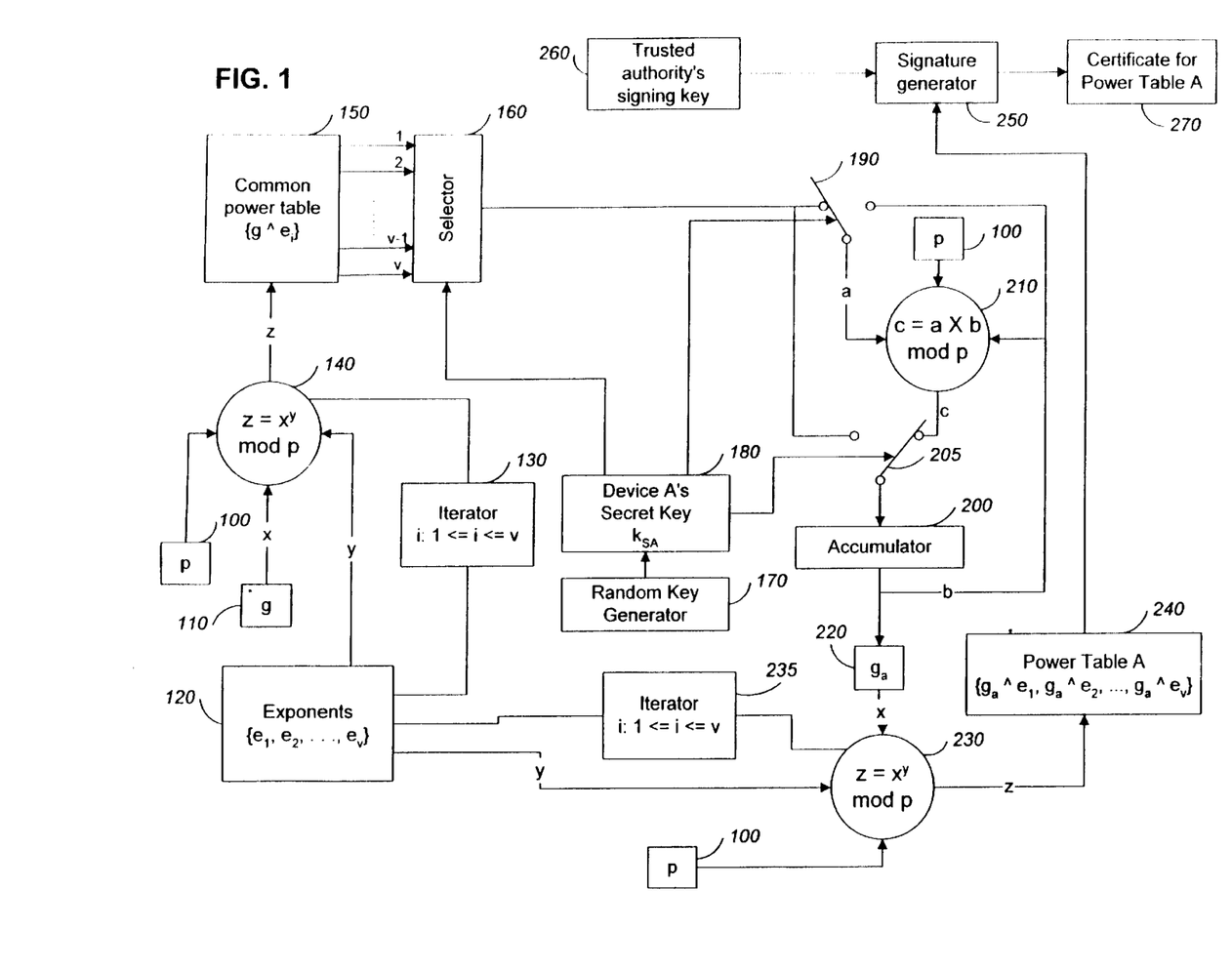
FIG. 1 is a block diagram of a device for generating secret keys and associated power tables by a trusted authority according to the invention.

Referring to FIG. 1, in one embodiment, the key agreement scheme uses a pre-agreed modulus p, in a register 100, a generator g, in a register 110, and a table of exponents $\{e_1, e_2, \ldots, e_v\}$, 120, with v elements. These parameters are publicly known and common to all users. Unless stated otherwise, all of the arithmetic operations described below—multiplications, squarings, and exponentiations—are modular arithmetic operations with modulus p.

Each user or device A has a unique secret key $k_{SA}$. Each secret key $k_{SA}$ defines an ordered sequence of c calculations applied to the elements of a table with v elements. This sequence of calculations is referred to as a calculation sequence. A calculation sequence is defined as follows:

1) A sub-set of entries is selected from the table and multiplied together.
2) The result of the multiplication is squared and then multiplied by another sub-set of the table entries.
3) Squaring and multiplying by additional sub-sets of the table entries is repeated until the sum of the number of squarings and multiplication by entries picked from the table equals the total computational budget c. At each stage, sub-sets are selected such that no table entry is chosen more than once, with the empty set and the entire table being acceptable sub-sets if the computational budget so allows.

For the trusted authority to generate a unique secret key for Device A, 500 (FIG. 2), an iterator 130 uses an exponentiator 140 to iterate over the operation $z=g^{e_i}$ for values of I ranging from 1 to v. Each resulting value of z is stored in a common power table 150 containing the elements $\{g^{e_1}, g^{e_2}, \ldots, g^{e_v}\}$. Since this calculation is common to all users it can be performed just once by the trusted authority as part of the system definition.

Next, a random key generator 170 randomly generates an allowable secret key $k_{SA}$ for Device A, 500, in the form of a calculation sequence, and stores it in a controller 180 for applying the calculation sequence to the common power table 150. One way that uniformly distributed random keys can be generated is by generating uniformly distributed binary numbers and converting them to calculation sequences, as described below. Each calculation in the calculation sequence is performed sequentially beginning with the first calculation in the calculation sequence.

The calculations in the calculation sequence are performed as follows. An accumulator 200 stores a running result of the application of the calculation sequence. A multiplier 210 multiplies its inputs (a and b) and places the result on its output (c). In the case of a calculation which is a multiplication, the calculation is associated with a selected index I into the common power table 150. A selector 160 selects the table entry with index I from the common power table 150 and places the table entry on the output of the selector 160. If the first calculation in the calculation sequence is a multiplication, the controller 180 positions the switch 205 in its left-hand position, causing the selected table entry to be loaded directly into the accumulator 200. In the case of all other multiplications, the controller 180 positions the switch 205 in its right-hand position, places the switch 190 in its left-hand-position, and loads the output of the multiplier 210 into the accumulator 200. This has the effect of multiplying the selected table entry by the previous value of the accumulator 200 and placing the result in the accumulator 200.

In the case of a calculation which is a squaring, the controller 180 positions the switch 190 in its right-hand position and loads the output of the multiplier 210 into the accumulator 200. This has the effect of multiplying the previous value of the accumulator 200 by itself and placing the result in the accumulator 200. After each calculation in the calculation sequence has been performed by the controller 180, as described above, the output of the accumulator 200 is stored as $g_a$, in a register, 220. When the calculation sequence begins with one or more squarings, such squarings do not need to be performed. However, in the preferred embodiment such leading squarings are performed, after which the accumulator is loaded with the first table entry used by the calculation sequence after the leading squarings.

An iterator 235 then uses an exponentiator 230 to raise the value $g_a$, in the register 220, to each of the exponents $\{e_1, e_2, \ldots, e_v\}$, 120, producing a table of pre-computed powers 240 of $g_a$ 220. The trusted authority then uses its signing key 260 and the table of pre-computed powers 240 as inputs to a signature generator 250 to produce a certificate attesting to the authenticity of the table of pre-computed powers 240. Typically, to do this, the trusted authority will sign a secure hash of the table 240. The trusted authority then delivers the table of pre-computed powers 240, the secret key $k_{SA}$ and the certificate 270, to Device A, 500, over a trusted communications path. The pre-computed table 240, the secret key $k_{SA}$, and the certificate 270, are then stored by Device A, 500 for subsequent use in the key agreement protocol. The method of FIG. 1 can be performed in advance of running the key agreement protocol. Typically, it will be performed just once at the time the secret key $k_{SA}$ is first generated, such as when Device A, 500, is manufactured.

Figure 2:
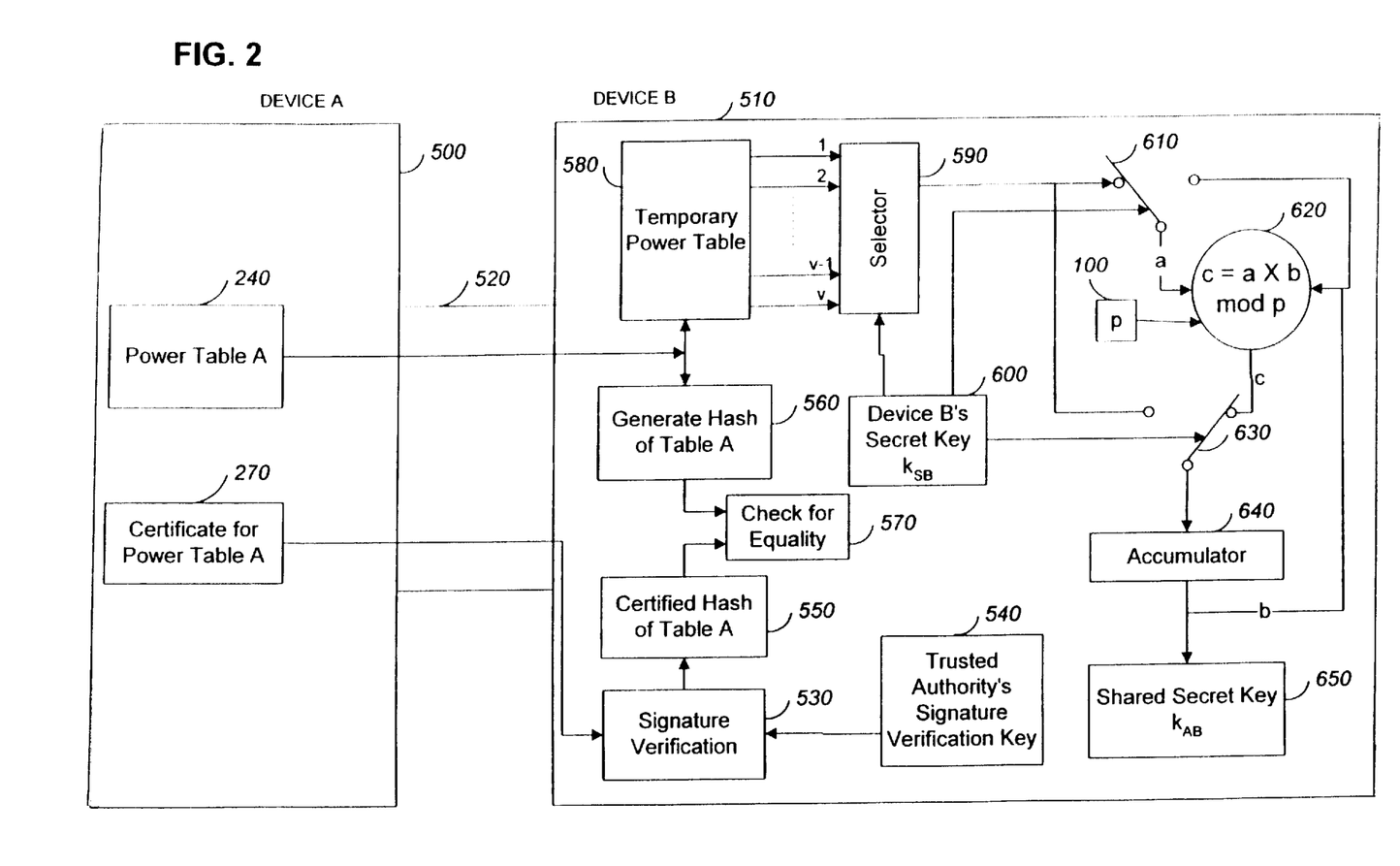
FIG. 2 is a block diagram of a system for generating a shared secret key by one device using a power table and accompanying certificate received from another device.

A method which can be used by Device B, 510, to generate a shared secret key $k_{AB}$ using Device A's pre-computed table of powers 240 and accompanying certificate 270 is shown in FIG. 2. Note that the method of FIG. 2 may also be used by Device A, 500, to generate the same shared secret key $k_{AB}$. To do this, the roles of Device A, 500, and Device B, 510, in FIG. 2 are exchanged. Note that FIG. 2 only shows those elements of Device A, 500, and Device B, 510, which are required for the following discussion.

Device A, 500, contains the pre-computed table of powers 240 for Device A, 500, and an accompanying certificate 270, as created according to the method and apparatus of FIG. 1. Device A, 500, communicates with Device B, 510, over a possibly insecure communications channel 520. First, Device A, 500, sends its certificate 270 to Device B, 510, over the communications channel 520. Device B, 510, uses the trusted authority's signature verification key, stored at 540, to perform signature verification 530 on the certificate 270, producing a certified secure hash 550 of the table 240. The trusted authority's signature verification key 540 and the hash function used by the signature verification 530 are publicly known. The certified hash function must be cryptographically secure and prevent the sender of the table 240 from modifying the table without detection by the recipient. The use of certificates adds to the computational load since the signature thereon must be verified as part of the key exchange protocol. However, there are public-key signature schemes for which the verification operation requires only one or two modular multiplications, for example, RSA signatures with a public exponent of 3, or modified-Rabin signatures.

Device A, 500, then sends its pre-computed table of powers 240 to Device B, 510, over the communications channel 520. Device B generates a hash of the table 240 using the public hash function 560. Device B, 510, then determines, at 570, whether the hash computed at 560 and the hash obtained at 550 are equal. If they are not equal, then certification of Device A's pre-computed table of powers 240 fails, and the shared secret key generation process terminates. Requiring authentication by each party of the pre-computed table of powers it receives can be seen as an extension of the common need, well known to those practiced in the cryptography field, of the parties to a key exchange authenticating each other's public keys in order to protect against a man-in-the-middle attack.

Otherwise, if the certification is confirmed, Device B, 510, stores Device A's pre-computed power table 240 in a temporary power table 580.

A controller 600 then applies Device B's 510 secret key $k_{SB}$, in the form of a calculation sequence, to the temporary power table 580 using a selector 590, a multiplier 620, an accumulator 640, and two switches 610, 630, as described with respect to FIG. 1. When the controller 600 completes its application of Device B's secret key to the temporary power table 580, the output of the accumulator 640 is stored by Device B, 510, as the shared secret key $k_{AB}$ 650. Once the shared secret key $k_{AB}$ has been generated by both Device A 500, and Device B, 510, the key can then be used in further cryptographic operations involving Device A, 500, and Device B, 510.

In the case that Device B, 510, contains insufficient RAM in its temporary storage 580 to contain the entire power table 240 at one time, a variant of the method of FIG. 2 can be performed by using additional communication bandwidth. Device B, 510, first receives and verifies Device A's certificate 270, and then stores the certified secure hash of Device A's table 550 in local memory. Device B, 510, requests and receives Device A's power table 240, and calculates the power table's 240 secure hash on-the-fly as the power table 240 is being received. Instead of storing the entire power table 240, Device B, 510, notes which entries of the power table 240 are first called for by Device B's secret calculation sequence, stores only so many of those entries as Device B, 510, has room for in temporary storage 580, and discards the remainder of the table entries. After Device A's power table 240 has been completely received, Device B, 510, confirms, at 570, that the secure hash of the table is correct 570. If the confirmation succeeds, Device B, 510, then performs a number n of computational operations, where n is no greater than the number of table entries for which there is room in temporary storage 580. Device B, 510, then re-requests the power table 240 from Device A, 500. Upon receipt of the power table 240, Device B, 510, again calculates, at 560, and verifies, at 570, the secure hash of the power table 240, and retains only those n new entries of the power table 240 now called for by Device B's secret calculation sequence. Device B, 510, then performs the next n calculations in Device B's secret calculation sequence. This process repeats until application of the calculation sequence is complete, except that the last iteration may entail application of fewer than n calculations. The number of computation operations n is fixed in order to mitigate susceptibility to timing attacks.

For purposes of maintaining security, there is a significant distinction between locally calculating powers of another party's public key and accepting pre-computed values from the other party, as shown in FIG. 2. In the former case it can be assumed that an attacker has no means to affect the calculation of powers, while in the latter case it is possible that an attacker can modify the pre-computed values in transit, or that the party sending the pre-computed values can itself maliciously manipulate the values it sends.

For example, assume a malicious participant M and another participant A. For many useful values of c and v, it can be likely that some table entries exist that participate few, if any, times in A's calculation sequence. M can obtain the correct shared secret key produced by an uncorrupted calculation by partaking in a non-malicious key exchange with A. If M subsequently performs a key exchange with A, M can change a single pre-computed table entry in a known way prior to transmission in the hope that it might be one such little-used table entry. M can then speculatively calculate the resulting shared secret keys that would be derived by A for each of the few possibilities M hypothesizes for the table entry's use in A's calculation sequence. In many cases, the subsequent use of the corrupted shared key by A provides M with a means to determine which, if any, of M's hypotheses was correct. M can then use this information, in conjunction with additional key exchanges with A, to deduce A's secret key.

An alternative embodiment employs a well-known alternative numeric representation known as a Montgomery representation, or Montgomery form, to improve the efficiency of the modular exponentiation. In this alternative embodiment, in the methods and apparatus of FIGS. 1 and 2, modular multiplications are replaced by Montgomery multiplications, or equivalently, by ordinary multiplication followed by Montgomery reduction.

Furthermore, an additional common public parameter R is chosen as the Montgomery reduction factor such that Montgomery reduction modulo p with respect to R is efficient. In this embodiment, the trusted authority's generator g is held in Montgomery form, and all calculations by the trusted authority are performed using Montgomery reduction in place of ordinary modular reduction, so that all results remain in Montgomery form. In this embodiment the entries in all power tables, such as 150, 240, and 580, are stored in Montgomery form. Modular multiplications and modular squarings performed by a device at key-exchange time are then replaced by multiplications and squarings incorporating Montgomery reduction, such that the accumulator always contains the Montgomery representation of the calculation in progress. In this embodiment the shared secret key $k_{AB}$ is the final value in the accumulator in Montgomery form, that is, no conversion from Montgomery form to normal form is performed.

In an alternative embodiment, the signed certificate 270 contains certified secure hashes of not necessarily distinct sub-sets of table 240 entries, either as well as or instead of a certified secure hash of the entire table 240, subject to the constraint that each and every table entry participates in at least one of the certified secure hashes contained in the certificate 270.

It is to prevent this kind of attack, that it is necessary for A and B to authenticate the tables received from each other, as described above. Such authentication can be provided by use of a certificate, signed by a mutually trusted third party, attesting to the authenticity of an entire table of pre-computed powers.

In the preferred embodiment of the invention, a keyspace is defined by the number of calculation sequences that, when applied, lead to unique results. By appropriate choice of the modulus p, 100, generator g, 110, and table of exponents $\{e_1, e_2, \ldots, e_v\}$, 120, one can ensure that all calculation sequences lead to unique results. In a typical embodiment, the number of calculations c, in a calculation sequence, and the number of values v, in the table to which the calculation sequence is applied, are selected and fixed for all users such that the keyspace is large enough to resist an attack of up to a chosen work factor, anticipating that the best such attack will have a work factor as low as the square root of the size of the keyspace. A typical medium-security application might fix the c and v to allow $2^{160}$ possible keys in order to be resistant to attacks having a work factor of up to $2^{80}$ operations. In low-security applications, keyspaces as small as $2^{80}$ possibilities, for protection against attack of complexity $2^{40}$, might be acceptable.

Having discussed the general process of operation according to the invention, the following is a description of how to construct a pre-computed table of the form $\{g^{e_1}, g^{e_2}, \ldots, g^{e_v}\}$ so that each calculation sequence leads to a unique result. If c is the number of calculations in a calculation sequence, and s is the number of calculations in the calculation sequence that are squarings, then s is less than or equal to c, and the number of calculations in the calculation sequence that are multiplications is c minus s. Since the very first value selected from the table by the calculation sequence is placed directly into the accumulator, 200 or 640, and therefore involves no multiplication, the total number of (not necessarily distinct) entries picked from the table to participate in the calculation sequence is given by $t_s = c - s + 1$, where $t_s$ stands for the number of table entries picked as a function of the number of squarings.

In the preferred embodiment, the table of exponents $\{e_1, e_2, \ldots, e_v\}$, 120, are chosen such that $e_i = 2^{(i-1)(s_{max}+1)}$ for $1 \leq I \leq v$, where $s_{max}$ is the maximum number of squarings used by any of the calculation sequences. Clearly, as each exponent $e_i$ is an integer power of two, each exponent $e_i$ is represented in binary form by a string of bits containing a single 1 in a particular position. For this form of the exponents, $e_{i+1} = 2^{(s_{max}+1)} e_i$. In other words, the single bits in the exponents are separated from one another by $s_{max}+1$ bit positions.

In the preferred embodiment, the value in the accumulator at any given time is equivalent to g to some power x. We refer to x as the accumulated exponent. Every table entry in the table $\{g^{e_1}, g^{e_2}, \ldots, g^{e_v}\}$ is equivalent to g to some power y. We refer to y for a given table entry as the power of g of the table entry. Selecting a table entry and multiplying it into the accumulator has the effect of adding the table entry's power of g to the accumulated exponent. For the choice of exponents $\{e_1, e_2, \ldots, e_v\}$, 120, used in the preferred embodiment, as specified above, this adds a "1" to the accumulated exponent at a specific bit position. If the accumulated exponent previously had a zero in that bit position then multiplying the accumulator by the table entry is equivalent to setting the corresponding bit of the accumulated exponent to 1.

Performing a squaring on the accumulator has the effect of doubling the accumulated exponent or, equivalently, shifting the accumulated exponent one bit to the left. For the moment we ignore the situation when the exponent overflows the length of the modulus p, 100. The definition of calculation sequences provided above requires that once a given table entry has been selected, it cannot be selected again without first performing a squaring. Given that each squaring moves the exponent of the value stored in the accumulator one bit position to the left, and that the number of squarings in a calculation sequence is at most $s_{max}$ a "1" bit arising in the accumulated exponent from the selection of a given table entry cannot move so far up the exponent as to reach the bit position corresponding to that of another table entry because the single-bit exponents of adjacent table entries are separated by $s_{max}+1$ bit positions.

In the case of the preferred form of exponents described above, at the very beginning of the calculation sequence, and again after each squaring, there will be a zero at every bit position in the accumulated exponent for which there is a one in any $e_i$ in $\{e_1, e_2, \ldots, e_v\}$, 120, so that multiplying a table entry into the accumulator will increase the Hamming weight (the number of ones) of the accumulated exponent by one. Also, because there are v entries in the table, each squaring provides v additional bit positions in the accumulated exponent that can be chosen from to be set to 1.

Therefore, for a calculation sequence involving s squarings, the accumulated exponent will have a Hamming weight of $t_s = c - s + 1$, where these bits are selected from a space of $v_s = v(s+1)$ possible positions. In defining the full set of fixed length calculation sequences, squarings may be traded against multiplications. In other words, s may range from zero to c, inclusive. Since the selection space $v_s$ must be at least as large as the Hamming weight $t_s$, there may also be some non-zero minimum number of squarings required when the size of the table v is small compared to the computational budget c.

Given $t_s = c - s + 1$, $v_s = v(s+1)$, the total number of allowed calculation sequences or unique keys, K, is therefore given by $$K = \sum_{s=s_0}^{c} \binom{v_s}{t_s}$$

where $$s_0 = \left\lceil \frac{c+1-v}{v+1} \right\rceil,$$

except that $s_0 = 0$ if $v \geq c+1$.

For the specified form of the power table $\{g^{e_1}, g^{e_2}, \ldots, g^{e_v}\}$ the accumulated exponent resulting from application of a calculation sequence with s squarings has a length of up to $v(s+1)$ bits. If q is the group order of the generator g, then under modular exponentiation, exponents belonging to the same residue class modulo q are equivalent. To ensure that all calculation sequences lead to a unique result it is preferred that $s_{max}$, the maximum number of squarings used by any of the calculation sequences, be chosen such that $v(s_{max}+1) \leq \lfloor \log_2 q \rfloor$.

It is well known that the operation of modular squaring of multiple-precision numbers can be performed more quickly than the general modular multiplication thereof. This is because, for the straightforward method of multiplication, almost half of the partial products in a multiple-precision non-modular squaring are duplicates and so need not be re-calculated.

Optimizing modular squaring operations can speed up the key exchange process but can lead to exposure to timing attacks unless all calculation sequences achieve the same advantage from optimization. A preferred embodiment achieves this goal by maximizing the number of squarings common to all calculation sequences and then optimizing exactly that number of squarings. Calculation sequences that include more than this common minimum number perform the excess number of squarings by the method of general (non-optimized) modular multiplication. In the alternative embodiment previously described in which Device B, 510, contains insufficient RAM in its temporary storage 580 to contain the entire power table 240 at one time, the total computation time is preferably fixed by not optimizing any of the squarings, since otherwise to achieve fixed computation time the squarings would need to be uniformly distributed among the groups of n operations, which typically constrains the keyspace unduly.

If $s_{min}$ is this minimum number of squarings among all calculation sequences then $s_{min}$ is preferably chosen as large as possible such that $$\sum_{s=s_{min}}^{s_{max}} \binom{v_s}{t_s} \geq K_D$$

where $s_0 \leq s_{min} \leq s_{max} \leq c$, and $K_D$ is the desired size of the keyspace and is chosen as the square of the maximum work factor of attacks which are to be protected against (e.g. $K_D = 2^{160}$ for protection against attacks of complexity $2^{80}$ operations). The revised keyspace $K'$ is then given by $$K' = \sum_{s=s_{min}}^{s_{max}} \binom{v_s}{t_s}.$$

For example, in the case where c=50 and v=20, the total number of possible keys, with s allowed to vary from 2 to 50, is approximately $1.99 \times 2^{160}$. However, more than $2^{160}$ of these keys belong to the cases in which the calculation sequence contains exactly 16, 17, or 18 squarings. Thus, it is possible to restrict the keyspace to calculation sequences with 16, 17, or 18 squarings, and to optimize 16 of the squarings in each case while maintaining a fixed computation time. In this case, the maximum exponent length $v_s$ is $20 \times (18+1) = 380$ bits. Table 1 lists some selected parameters for 160-bit exponent diversity. The optimized calculation time in Table 1 is the fixed time of all calculations, assuming that a modular squaring takes 75% as long as a general modular multiplication. Note that, for the given $K_D$, memory (v) can be traded against computational complexity (c).

TABLE 1

Example parameters for $K_D = 2^{160}$

| v | c | $s_{min}$ | $s_{max}$ | Maximum exponent length | Optimized calculation time |
|---|---|-----------|-----------|-------------------------|----------------------------|
| 1 | 230 | 165 | 175 | 176 | 188.75 |
| 2 | 145 | 85 | 95 | 192 | 123.75 |
| 3 | 114 | 62 | 67 | 204 | 98.5 |
| 4 | 98 | 50 | 54 | 220 | 85.5 |
| 6 | 80 | 34 | 41 | 252 | 71.5 |
| 7 | 75 | 32 | 35 | 252 | 67.0 |
| 8 | 71 | 30 | 32 | 264 | 63.5 |
| 10 | 65 | 27 | 29 | 300 | 58.25 |
| 12 | 60 | 22 | 26 | 324 | 54.5 |
| 15 | 55 | 17 | 23 | 360 | 50.75 |
| 16 | 54 | 18 | 20 | 336 | 49.5 |
| 20 | 50 | 16 | 18 | 380 | 46.0 |
| 24 | 47 | 14 | 16 | 408 | 43.5 |
| 32 | 43 | 12 | 14 | 480 | 40.0 |
| 40 | 40 | 9 | 14 | 600 | 37.75 |
| 80 | 34 | 10 | 10 | 880 | 31.5 |
| 120 | 30 | 5 | 8 | 1080 | 28.75 |
| 126 | 30 | 7 | 7 | 1008 | 28.25 |

The following is a description of how a trusted authority can randomly generate keys by generating a random binary value and mapping it into a calculation sequence, which may be required in some applications. For instance, the four cases of 15, 16, 17, and 18 squarings each encompass more than $2^{158}$ possibilities, so if a 160-bit binary value has to be encoded into a calculation sequence it may be convenient to use two of the bits of the binary value to select one of the four cases (i.e., either 15, 16, 17, or 18 squarings), while the other 158 bits get encoded by a calculation sequence having the selected number of squarings, or equivalently, into a bit string of fixed length and Hamming weight.

For the general case, one method of mapping an integer m in the range 0 to $K_D-1$ into one of the K' possible calculation sequences is to first pick the smallest $s_K$, $s_{min} \leq s_K \leq s_{max}$, such that $$\sum_{s=s_{min}}^{s_K} \binom{v_s}{t_s} > m.$$

$s_K$ becomes the number of squarings in this particular calculation sequence.

If $s_{min}=s_K$ we set n, the residue to be coded, to m, otherwise we set $$n = m - \sum_{s=s_{min}}^{s_K} \binom{v_s}{t_s}.$$

We now have that $$0 \le n < \binom{u}{w}$$

where $u=v(s_K+1)$ and $w=c-s_K+1$. The process then continues by mapping n into, U, a bit-string of length u, and Hamming weight w, composed of u bits $k_1$ to $k_u$.

One way of achieving this is by the following algorithm:

$$n_1 = n, w_1 = w$$

for $i = 1$ to $i = u$ $$\{$$

$$\text{if } n_i \ge \binom{u-i}{w_i} \text{ then } n_{i+1} = n_i - \binom{u-i}{w_i}, w_{i+1} = w_i - 1, k_i = 1$$

$$\text{else } n_{i+1} = n_i, w_{i+1} = w_i, k_i = 0$$

$$\}$$

where we define $$\binom{i}{j}$$

as 0 when $j > i$.

In simple terms, starting with the full available exponent length and the allowed Hamming weight this algorithm tests whether the integer can be represented in a one-bit shorter bit-string having the allowed weight. If not, then the current bit is set to one and the integer is reduced by the number of combinations supported by the shorter bit-string while the remaining Hamming weight is reduced by one. If the integer could have been represented in the shorter bit-string then the current bit is set to zero while the integer and remaining Hamming weight go unchanged.

The above algorithm is for illustrative purposes only. An alternative implementation would more efficiently take advantage of the simple relationship between $$\binom{i}{j} \text{ and } \binom{i-1}{j},$$

and between $$\binom{i}{j} \text{ and } \binom{i}{j-1},$$

to avoid calculating the binomial coefficients afresh for each stage of the mapping process. Also, if the total number of combinations is greater than the number of possibilities that must be encoded, then the binomial coefficients need not be found exactly, and can be replaced by a tabulation of crude approximations so long as the accumulation of lost keyspace through such approximation does not exceed the available excess. Other more computationally efficient mapping algorithms can also be used, possibly with some reduction in the range of integers that can be mapped into bit-string of given length and weight.

The final stage is translation from this form into a calculation sequence. One method is to proceed as follows. The u-bit string is segmented into v contiguous groups of $s_K+1$ bits, and these v groups of bits are set one on top of another so as to form a rectangular array of bits having v rows and $s_K+1$ columns. Taking each column in turn, the rows containing ones in that column are taken as the indices of the table entries that are to participate in the calculation sequence before the next squaring, so that for instance a one in the first row means that the first table element will participate, while a one in the last row calls for the participation of the last, i.e. vth, table element. The calculation sequence is completely defined by the list of participating table entries between squarings and the list of stages in the calculation sequence at which a squaring must occur. Because this final translation stage is trivial, it may be convenient to store the representation of the key in the untranslated form, e.g., as the v by $s_K+1$ rectangular array of bits, and perform the translation whenever the calculation sequence must be performed.

A calculation sequence may also be randomly selected with probability no greater than $$\frac{1}{K_D},$$

from the set of K' calculation sequences, by first selecting its number of squarings $s_K$, $s_{min} \le s_K \le s_{max}$, such that each value of $s_K$ is chosen with probability no greater than $$\binom{v_{s_K}}{t_{s_K}} / K_D,$$

where $$v_{s_K} = v(s_K + 1)$$

and $t_{s_K} = c-s_K+1$.

When $K_D < K40$ these allowed probabilities will sum to more than one while the actual probabilities must sum to exactly one. This gives some flexibility in the assignment of probabilities to each value of $s_K$. A convenient use of this flexibility is to allow the chosen probabilities assigned to each $s_K$ to have a simple binary fractional representation. For example, in the case that v=20, c=50, $K_D 2^{160}$, and we want to select from calculation sequences having one of 16, 17, or 18 squarings, then by evaluating $$\binom{340}{16} > 0.43 \times 2^{160}, \binom{360}{17} > 0.38 \times 2^{160},$$

$$\text{and } \binom{380}{18} > 0.25 \times 2^{160},$$

we find a convenient assignment of probabilities as $\frac{3}{8}$, $\frac{3}{8}$, and $\frac{1}{4}$ to the cases of 16, 17, and 18 squarings respectively. For a given system implementation in which c, v, $s_{min}$, $s_{max}$, and $K_D$ are fixed, these calculations need only be performed once, with the assigned probabilities being recorded for every subsequent use. This binary fractional representation of the probabilities allows a uniformly distributed binary random variable, having as many bits as are necessary for the fractional representations, in this case 3 bits, to select the number of squarings in a statistically appropriate manner.

Once the number of squarings has been selected, a random calculation sequence for that number of squarings can be specified by selecting w positions at random within a u-bit string of zeros, and setting them to one. Conversion from such a bit-string to a calculation sequence has been previously described.

In the preferred embodiment, key exchange according to the invention is equivalent to Diffie-Hellman key exchange, where U is equivalent to the secret exponent normally chosen for Diffie-Hellman key exchange. From this it will be clear to one practiced in the art that the method of FIG. 2 is equivalent to discrete exponentiation, where U is the exponent, and $g_a$ (stored in 220 in FIG. 1) is the base. Furthermore, it will be clear to one practiced in the art that the method of FIG. 2 is equally suited to other applications of discrete exponentiation in which the exponent can be of the form of U; however, in such cases, $g_a$ (stored in 220) need not be created according to the method of FIG. 1, but can be an arbitrary $g_x$, so long as the pre-computed table powers is constructed from $g_x$ in the same way as the pre-computed table of powers 240 is constructed from $g_a$ according to the method of FIG. 1, with the preferred form of the table of exponents $\{e_1, e_2, \ldots, e_v\}$ 120. It will also be clear to one practiced in the art that where the base $g_x$ is already known to Device B, 510, and where the pre-computed table of powers is calculated in advance by Device B, 510, the elements 530, 540, 550, 560, and 570 are unnecessary. It will also be clear to one practiced in the art that where the base $g_x$ is already known to Device B, 510, and where the pre-computed table of powers is owned by and permanently contained in Device B, 510, the elements 530, 540, 550, 560, and 570 are unnecessary, and the pre-computed table of powers can be stored in a permanent storage location rather than in the temporary table of powers 580.

The invention may also be implemented according to a number of embodiments including, but not limited to, the following.

The generator g may be secret and not disclosed by the trust authority.

In a preferred embodiment, p is chosen prime such that (p−1)/2 is also prime, and g is chosen to be a generator of the prime order sub-group of order q=(p−1)/2.

In an alternative embodiment, the modulus p can be chosen to be prime such that p−1 has a large prime factor q, and in such a case, g can be chosen to be a generator of the prime order sub-group of order q.

In another alternative embodiment, the modulus p can be chosen prime such that p−1 has a large prime factor q, and in such a case g can be chosen to be a generator of a high order sub-group of p.

In another alternative embodiment, p can be chosen as the product of two or more large primes where the factorization of p is secret and is not disclosed by the trusted authority, and in such a case g can be chosen to be a generator of a high order sub-group of p.

In the following alternative embodiments, unique results of applying calculation sequences are not guaranteed.

In one embodiment, the table of exponents $\{e_1, e_2, \ldots, e_v\}$ 120 can be chosen at random from $0 < e_i < p-1$. In another embodiment, the table of exponents $\{e_1, e_2, \ldots, e_v\}$ 120 can be chosen at random from $0 < e_i < p-1$ and be secret and not disclosed by the trusted authority. In another embodiment, the parameters $s_{max}$ and $s_{min}$ can be chosen in any combination such that $s0 \leq s_{min} \leq s_{max} \leq c$.

In another embodiment, calculation sequences can be allowed in which an entry can be picked from the table even if a squaring has not occurred since the entry was last used by the calculation sequence.

In another embodiment, intermediate results in the accumulator can be stored as entries in the temporary power table 580, either in addition to, or as replacements for, existing table entries, the specific action being dictated by the secret key. A further possible variation allows that whenever an accumulated result is stored in the temporary power table 580, both inputs to the modular multiplier 620 can optionally have entries of the temporary power table 580 applied to them for the next calculation step, as determined by the secret key, instead of requiring that one input to the accumulator always be connected to the output of the accumulator, as in the embodiments previously discussed.

Although elements of the invention are described in terms of a software implementation, the invention may be implemented in software or hardware or firmware, or a combination of any of the three.

The present invention has been described in terms of several embodiments. The invention, however, is not limited to the embodiments depicted and described. Rather, the scope of the invention is defined by the claims.

What is claimed is:

1. A method of cryptographic key exchange, comprising the steps of:
   selecting a modulus;
   selecting a generator;
   selecting an ordered plurality of exponents;
   populating entries of a power table with the generator raised to the power of each one of the plurality of exponents, modulo the modulus;
   producing a first result by performing calculations defined by a calculation sequence known to a first party and not known to a second party on entries of the power table; and
   populating entries of a pre-computed table of powers with results of raising the first result to the power of each of the plurality of exponents, modulo the modulus.

2. The method of claim 1, further comprising the step of:
   transmitting the pre-computed table of powers to the first party.

3. The method of claim 2, further comprising the step of:
   generating a signed secure certificate attesting to the authenticity of one or more subsets of the pre-computed table of powers.

4. The method of claim 3, wherein:
   the signed secure certificate contains a certified secure hash of the pre-computed table of powers.

5. The method of claim 3, wherein:
   the generating step is performed by a trusted authority trusted by the first party and by the second party.

6. The method of claim 5, further comprising the step of:
   transmitting the signed secure certificate to the first party.

7. The method of claim 6, further comprising the step of:
   transmitting the secret calculation sequence of the first party to the first party.

8. The method of claim 7, further comprising:
   transmitting the signed secure certificate to the second party;
   performing signature verification on the signed secure certificate to produce a first certified secure hash of the pre-computed table of powers;

transmitting the pre-computed table of powers to the second party;

applying a hash function to the pre-computed table of powers to produce a second certified secure hash of the pre-computed table of powers; and comparing the first certified secure hash with the second certified secure hash.

9. The method of claim 8, further comprising:

producing a shared key by applying a secret calculation seqence of the second party to the pre-computed table of powers.

10. The method of claim 8, wherein calculations in the sequence of calculations comprise Montgomery calculations.

11. The method of claim 10, further comprising the step of selecting a Montgomery reduction factor, and wherein the generator is stored in Montgomery form.

12. The method of claim 3, wherein the generating step further comprises:

generating the secure certificate using an RSA signature method with a public exponent of 3.

13. The method of claim 3, wherein the generating step further comprises:

generating the signed secure certificate using a modified-Rabin scheme.

14. The method of claim 3, wherein the signed secure certificate comprises secure hashes of a plurality of subsets of entries of the power table.

15. The method of claim 1, wherein the secret calculation sequence defines a sequence of calculations applicable to entries of the power table.

16. The method of claim 15, wherein the sequence of calculations defined by the secret calculation sequence comprises;

a multiplication of a first sub-set of entries of the power table to produce a product;

a squaring of the product to produce an intermediary result;

a multiplication of the intermediary result by a second sub-set of entries of the power table.

17. The method of claim 16, wherein each entry in the first sub-set of entries is distinct.

18. The method of claim 16, wherein the first subset is empty.

19. The method of claim 16, wherein the first subset comprises all of the entries of the power table.

20. The method of claim 1, wherein the ordered plurality of exponents comprise successive integral powers of 2.

21. The method of claim 1, wherein:

the modulus is a prime number p;

(p−1)/2 is a prime number; and the generator is a number g such that g is a generator of the prime order sub-group of order (p−1)/2.

22. The method of claim 1, wherein:

the modulus is a prime number p; and (p−1) has a large prime factor q.

* * * * *